United States Patent [19]

Ota et al.

[11] Patent Number: 4,824,654
[45] Date of Patent: Apr. 25, 1989

[54] PROCESS OF PRODUCING NEEDLE-SHAPED CALCIUM CARBONATE PARTICLES

[75] Inventors: Yoshio Ota; Norifumi Goto; Iwao Motoyama; Tetsushi Iwashita; Kunio Nomura, all of Ogaki, Japan

[73] Assignee: Yabashi Industries Co., Ltd., Gifu, Japan

[21] Appl. No.: 169,397

[22] Filed: Mar. 17, 1988

[51] Int. Cl.$^4$ .......................... C09C 1/02; C01B 5/24; C01B 1/18

[52] U.S. Cl. .................................... 423/432; 423/165; 106/464

[58] Field of Search ............... 423/430, 432, 165, 168; 106/306, 464

[56] References Cited

U.S. PATENT DOCUMENTS

| | | | |
|---|---|---|---|
| 2,467,082 | 4/1949 | Fleck | 423/432 |
| 3,320,026 | 5/1967 | Waldeck | 423/432 |
| 3,340,003 | 9/1967 | Judd | 423/165 |
| 3,627,480 | 12/1971 | Birchall | 423/430 |
| 3,669,620 | 6/1972 | Bennett et al. | 423/432 |

FOREIGN PATENT DOCUMENTS

| | | | |
|---|---|---|---|
| 58-36924 | 3/1983 | Japan | 423/430 |
| 59-223225 | 12/1984 | Japan | 423/432 |
| 1239407 | 7/1971 | United Kingdom | 423/432 |

Primary Examiner—Gary P. Straub
Attorney, Agent, or Firm—Koda and Androlia

[57] ABSTRACT

Disclosed is a novel process of producing needle-shaped calcium carbonate particles. In the process of the present invention, aqueous calcium hydroxide solution is added to an aqueous medium bath with a temperature of not less than 60° C. into which carbon dioxide gas or a carbon dioxide-containing gas is being blown to generate needle-shaped calcium carbonate particles. The temperature of the aqueous medium bath is kept not less than 60° C. during the addition of the aqueous calcium hydroxide solution. Then the generated needle-shaped calcium carbonate particles are recovered.

8 Claims, 5 Drawing Sheets

PROCESS OF PRODUCING NEEDLE-SHAPED CALCIUM CARBONATE PARTICLES

BACKGROUND OF THE INVENTION

I. Field of the Invention

This invention relates to a process of producing needle-shaped calcium carbonate particles which are useful as a filler or a reinforcing material of various materials such as rubbers, papers, plastics and paints.

II. Description of the Prior Art

The calcium carbonate actually used in industrial fields may be roughly divided into two gropus, i.e., heavy calcium carbonate and precipitated calcium carbonate. Heavy calcium carbonate is prepared by mechanically pulverizing limestone into fine particles. The shape of the heavy calcium carbonate particles is irregular and the particle size is in the range of several micrometers to 150 $\mu$m.

On the other hand, precipitated calcium carbonate may be divided into two groups, i.e., so called light calcium carbonate with a particle size of 1-3 $\mu$m and so called colloidal calcium carbonate with a particle size of 0.02-0.1 $\mu$m. Precipitated calcium carbonate particles are currently manufactured by "liquid-liquid" process or by "liquid-gas" process. In the liquid-liquid process, a solution containing carbonate ion such as sodium carbonate and ammonium carbonate solution is reacted with a solution of a calcium compound such as calcium chloride and calcium acetate to produce calcium carbonate. In the liquid-gas process, a slurry of calcium hydroxide is reacted with carbon dioxide gas to produce calcium carbonate. In industrial fields, the liquid-gas process is usually employed and by changing the reaction conditions such as the concentration of the calcium hydroxide slurry, reaction temperature, manner of reaction and whether or not adding an additive, calcium carbonate particles with various shapes and sizes may be obtained. That is, calcium carbonate particles with a shape of spindle, pillar and cubic may be obtained. Further, a process of producing calcium carbonate particles having projections is disclosed in Japanese Patent Disclosure (Kokai) No. 30815/82 and a process of producing calcium carbonate particles having combined needle-shaped calcium carbonate particles is disclosed in Japanese Patent Disclosure (Kokai) No. 31530/82.

As to a process of producing needle-shaped calcium carbonate particles, a process employing the above-mentioned "liquid-liquid" process is disclosed in Japanese Patent Disclosure (Kokai) No. 203728/84, by which needle-shaped calcium carbonate particles with a length of 30-60 $\mu$m and a diameter of 2-3 $\mu$m are obtained. However, this process has not been industrially practiced.

SUMMARY OF THE INVENTION

Accordingly, the object of the present invention is to provide a process for producing needle-shaped calcium carbonate particles with a high production efficiency by which substantially single crystalline needle-shaped calcium carbonate particles may be obtained.

In the process of the present invention, aqueous calcium hydroxide solution is added to an aqueous medium bath with a temperature of not less than 60° C. into which carbon dioxide gas or a carbon dioxide-containing gas is being blown to generate needle-shaped calcium carbonate particles. The temperature of the aqueous medium bath is kept not less than 60° C. during the addition of the aqueous calcium hydroxide solution. Then the generated needle-shaped calcium carbonate particles are recovered.

According to the process of the present invention, needle-shaped, substantially single crystalline calcium carbonate particles with an average length of, for example, 5-100 $\mu$m, and with an average diameter of, for example, 0.2-5 $\mu$m may be obtained with high production efficiency. The needle-shaped calcium carbonate particles may be used as a filler or reinforcing material of various materials such as rubbers, papers, plastics and paints. Since the particles are needle-shaped, they are easily aligned in a regular way, so that when contained in a material as a filler or a reinforcing material, the particles may confer high smoothness and an excellent gloss to the material. Further, the particles may confer high electric resistance, high modulus of elasticity. Still further, in cases where the particles are added to liquid macromolecule resin, the increase in the viscosity of the mixture is small. As a result, large amount of particles can be added to the resin, so that the cost of the resin composition may be reduced. Further the moldability of the resin composition may be promoted. By the process of the present invention, large needle-shaped particles of, e.g., 5-100 $\mu$m length and 0.2-5 $\mu$m diameter were first provided industrially by a liquid-gas process, i.e., a process utilizing the reaction between a liquid and a gas.

DETAILED DESCRIPTION OF THE PREFERRED EMBODIMENTS

Figure 1:
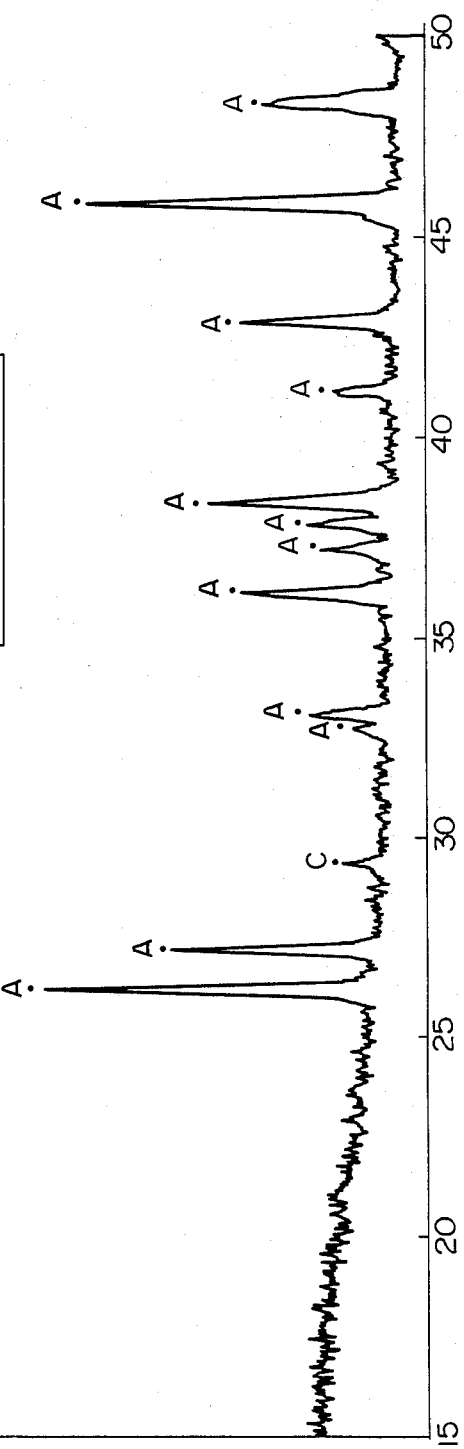
FIGS. 1 to 3 are X-ray diffraction profiles of the needle-shaped calcium carbonate particles obtained in the examples of the process of the present invention.

In the process of the present invention, aqueous calcium hydroxide solution is added to an aqueous medium bath into which carbon dioxide gas or a carbon dioxide-containing gas is blown. The temperature of the aqueous calcium hydroxide solution is not important at all, so that room temperature is usually employed in view of economy. The concentration of the aqueous calcium hydroxide solution may preferably be 0.04% to 0.17% by weight, and more preferably 0.10% to 0.17% by weight. The concentration of the aqueous calcium hydroxide solution may be increased by adding an agent which promotes the solubility of calcium hydroxide in water, such as sucrose so as to promote the production efficiency and to reduce the production cost accordingly. The preferred concentration of the agent in the aqueous calcium hydroxide solution varies depending on the nature of the agent added. In case of sucrose, 4 g to 10 g, preferably 4 g to 8 g of sucrose may be added per 1 g of calcium hydroxide.

Although the aqueous medium may contain any substance as long as the generation of the needle-shaped calcium carbonate particles is not hindered, it is preferred that the aqueous medium be water, aqueous calcium hydroxide solution, aqueous calcium hydrogen carbonate solution or aqueous calcium carbonate slurry.

Among these, water is most preferred. The temperature of the aqueous medium bath is not less than 60° C., and may preferably be 70° C. to 80° C. The temperature of the bath should be kept not less than 60° C. during the addition of the aqueous calcium hydroxide solution. In view of obtaining needle-shaped calcium carbonate particles with a uniform particle size, it is preferred that the temperature of the bath be kept constant.

The aqueous calcium hydroxide solution may be added to the aqueous medium bath as a continuous flow or dropwise. Alternatively, the aqueous calcium hydroxide solution may be injected into the bath. The addition of the aqueous calcium hydroxide solution to the bath may be conducted continuously or intermittently. The rate of adding the aqueous calcium hydroxide solution may preferably be not more than 150 ml/min. per 1,000 ml of the aqueous medium, and more preferably 30 to 100 ml/min. per 1,000 ml of the aqueous medium. It is preferred that the aqueous medium bath be stirred during the addition of the aqueous calcium hydroxide solution.

Carbon dioxide gas or a carbon dioxide-containing gas is blown into the aqueous medium during the addition of the aqueous calcium hydroxide solution. The flow rate of the carbon dioxide gas may preferably be not less than 1,000 ml (in terms of the volume under atmospheric pressure) per 1,000 ml of aqueous calcium hydroxide solution.

By the above-mentioned step, needle-shaped calcium carbonate particles with an average length of, e.g., 5–100 $\mu$m and with an average diameter of, e.g., 0.2 to 5 $\mu$m may be generated and precipitated in the bath.

The thus formed needle-shaped calcium carbonate particles are then recovered. The recovery may be conducted by any of the conventional methods such as filtration, evaporation of water and decantation. When the addition of the aqueous calcium hydroxide solution is conducted continuously, the recovery of the needle-shaped calcium carbonate particles may preferably be conducted continuously, and when the addition of the aqueous calcium hydroxide solution is conducted intermittently, the recovery of the needle-shaped calcium carbonate particles may preferably be conducted intermittently. In a preferred mode of the process of the present invention, the addition of the aqueous calcium hydroxide solution is conducted continuously to overflow the medium containing the generated needle-shaped calcium carbonate particles and the needle-shaped calcium carbonate particles are recovered from the overflowed medium. Thus, it should be noted that the aqueous medium is needed only in the initial stage and it is not necessary to add the additional aqueous medium during the process.

The particle size (length and diameter) of the calcium carbonate particles produced by the process of the present invention may be controlled by controlling the operation parameters such as adding rate of the aqueous calcium hydroxide solution and the temperature of the bath. The particle size becomes small with the increase of the adding rate of the aqueous calcium hydroxide solution and with the raise of the temperature of the aqueous medium bath.

The present invention will now be described in more detail by way of examples. The examples are presented for the illustration purpose only and should not be interpreted in any restrictive way.

EXAMPLE 1

Calcium oxide was added to distilled water with a temperature of about 80° C. to form calcium hydroxide slurry. After allowing the slurry to cool to room temperature, it was filtered to obtain an aqueous calcium hydroxide solution with a concentration of 0.17% by weight. The aqueous hydroxide solution was added dropwise to stirred 1,000 ml of distilled water in a bath kept at 80° C. at an adding rate of 50 ml/min. Carbon dioxide gas was blown into the water at a flow rate of 1,000 ml/min. with a pressure of 1.5 kg/cm$^2$ to generate needle-shaped calcium carbonate particles.

Figure 4:
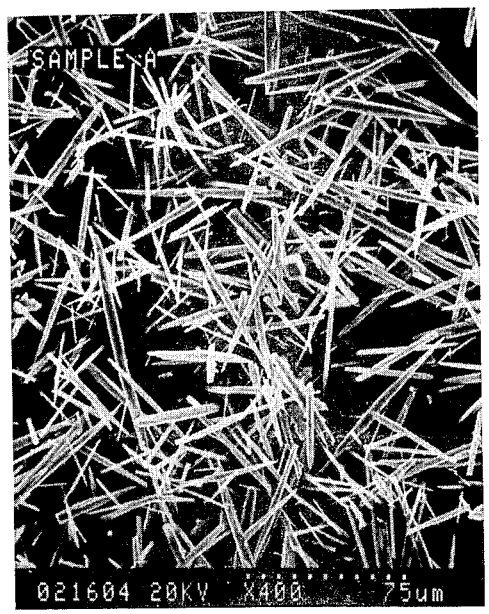
FIGS. 4 to 6 are photographs of the needle-shaped particles obtained in the examples of the process of the present invention, which photographs are taken with a scanning electromicroscope (SEM).

The generated needle-shaped calcium carbonate particles were recovered by filtration and dried at about 100° C. in an electric drier to obtain Sample A. The thus obtained Sample A was subjected to X-ray diffraction analysis and a photograph of Sample A was taken with a scanning electromicroscope (SEM). FIG. 1 shows the X-ray diffraction profile of Sample A. It can be seen from FIG. 1 that most of the peaks are of aragonite crystals. FIG. 4 shows the SEM photograph of Sample A. It can be seen from FIG. 4 that needle-shaped particles were obtained by the above-described process.

EXAMPLE 2

Figure 2:
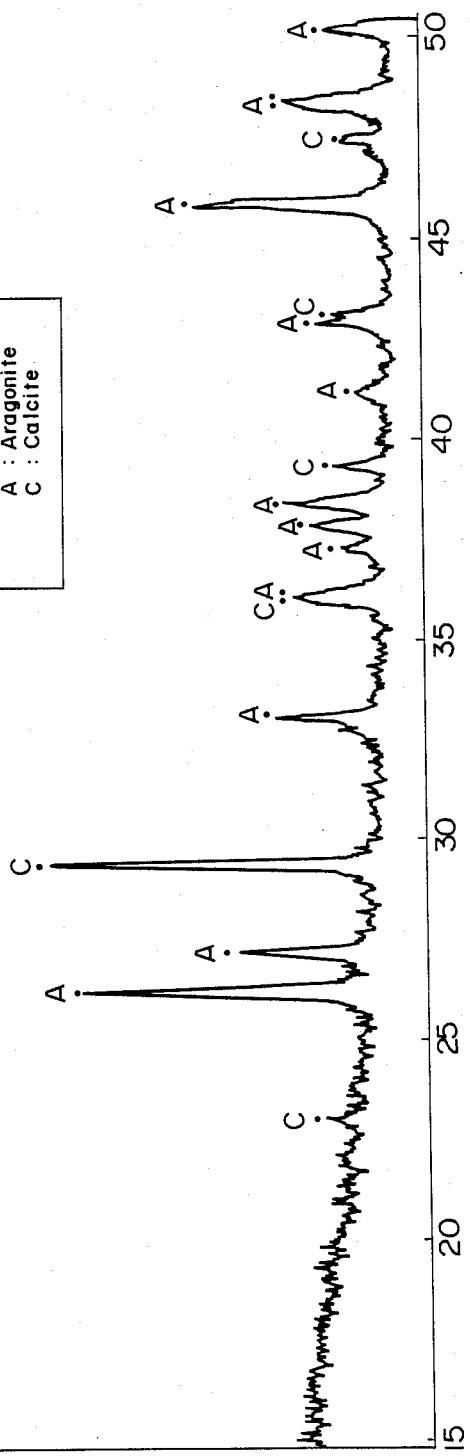
Figure 5:

The procedure described in Example 1 was repeated except that the adding rate of the aqueous calcium hydroxide solution was 150 ml/min. and the temperature of the aqueous medium bath was 70° C. to obtain Sample B. FIG. 2 shows the X-ray diffraction profile of Sample B. It can be seen from FIG. 2 that peaks of calcite are seen among the peaks of aragonite. FIG. 5 shows an SEM photograph of Sample B. It can be seen from FIG. 5 that needle-shaped particles smaller than those obtained in Example 1 were obtained.

EXAMPLE 3

To an about 1,000 ml of aqueous calcium hydroxide slurry with a concentration of 0.75 w/v %, 50 g of sucrose was added and the mixture was filtered to obtain an aqueous calcium hydroxide solution. The thus obtained aqueous calcium hydroxide solution was added dropwise to stirred 1,000 ml of distilled water with a temperature of 80° C. at an adding rate of 5 ml/min. The flow rate and the pressure of the carbon dioxide gas blown into the aqueous medium bath were the same as in Example 1. After the filtration and drying as Example 1, Sample C was obtained. Since the solubility of the calcium hydroxide was promoted by the addition of the sucrose, the yield was about four times that in Example 1.

Figure 3:
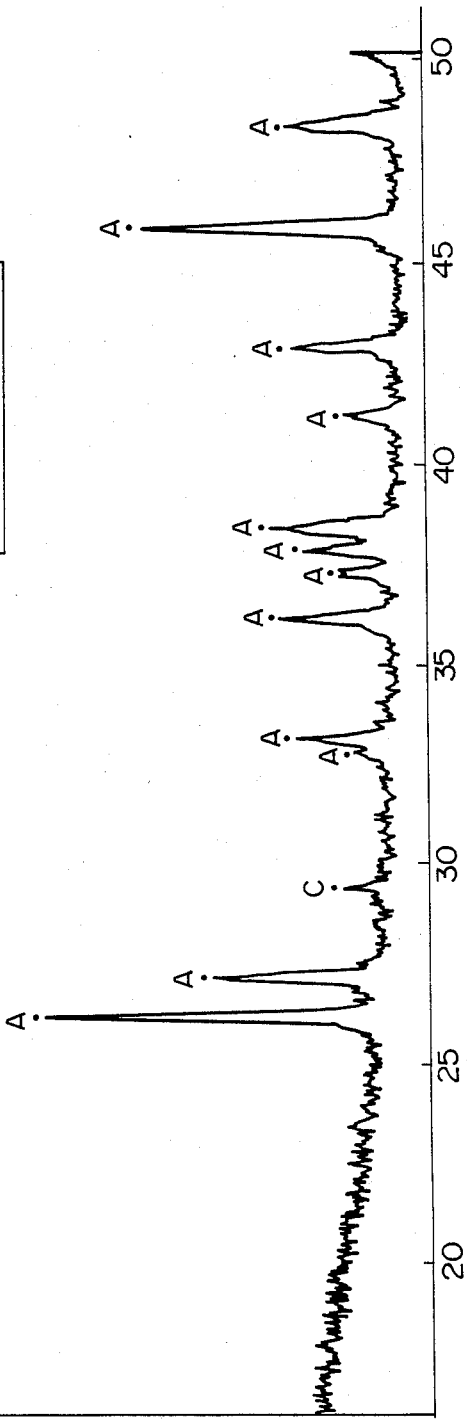
Figure 6:

FIG. 3 shows the X-ray diffraction profile of Sample C. It can be seen from FIG. 3 that most of the particles are of aragonite crystals. FIG. 6 shows an SEM photograph of Sample C. It can be seen from FIG. 6 that needle-shaped particles were obtained.

We claim:

1. A process of producing needle-shaped calcium carbonate particles consisting of the steps of adding, aqueous calcium hydroxide solution of a concentration of 0.04–0.17 % by weight to an aqueous medium bath with a temperature of not less than 60° C. and to which carbon dioxide gas or a carbon dioxide-containing gas is being blown to generate needle-shaped calcium carbonate particles, the temperature of the aqueous medium bath being kept not less than 60° C. during the addition of the aqueous calcium hydroxide solution; and recovering the generated needle-shaped calcium carbonate particles, said particles having an average length of 5 to 100 micrometers and an average diameter of 0.2–5.

2. The process of claim 1, wherein the addition of the aqueous calcium hydroxide solution and the recovery of the generated needle-shaped calcium carbonate particles are conducted continuously.

3. The process of claim 1, wherein the addition of the aqueous calcium hydroxide solution and the recovery of the generated needle-shaped calcium carbonate particles are conducted intermittently.

4. The process of claim 1, wherein the aqueous medium is selected from the group consisting of water, aqueous calcium hydroxide solution, and aqueous calcium hydrogen carbonate solution.

5. The process of claim 4, wherein the aqueous medium is water.

6. The process of claim 1, wherein the temperature of the bath is kept constant during the addition of the aqueous calcium hydroxide solution.

7. The process of claim 1, wherein the addition of the aqueous calcium hydroxide solution is conducted at an adding rate of not more than 150 ml/min. per 1,000 ml of the aqueous medium.

8. The process of claim 1, wherein the carbon dioxide gas is blown at a rate of not less than 1,000 ml in terms of the volume under atmospheric pressure per 1,000 ml of the aqueous calcium hydroxide solution.

* * * * *